(No Model.)

O. B. HALL.
FUSIBLE LINK FOR AUTOMATIC FIRE EXTINGUISHERS.

No. 324,316. Patented Aug. 11, 1885.

Witnesses
A. O. Orne
H. H. Letteney

Inventor
Osborn B. Hall
per T. W. Porter

UNITED STATES PATENT OFFICE.

OSBORN B. HALL, OF MALDEN, MASSACHUSETTS.

FUSIBLE LINK FOR AUTOMATIC FIRE-EXTINGUISHERS.

SPECIFICATION forming part of Letters Patent No. 324,316, dated August 11, 1885.

Application filed May 25, 1885. (No model.)

*To all whom it may concern:*

Be it known that I, OSBORN B. HALL, of Malden, in the county of Middlesex and State of Massachusetts, have invented a new and useful Improvement in Fusible Links for Automatic Fire-Extinguishers, which will, in connection with the accompanying drawings, be hereinafter fully described, and specifically defined in the appended claims.

This invention has for its object the production of an improved securing-link for that class of automatic fire-extinguishers which are held inoperative by means of a lever by which the valve is pressed to its seat, said lever being secured by means of a link which is of ample strength to resist the force exerted upon the lever until the rising heat reaches the danger-point, when the weakening effect of the heat upon the link causes it to give way, and thereby liberate the valve, and allow the consequent escape of the water that the valve held in check; and the invention consists in a link formed of two U-shaped sections of brass or other suitable metal telescoped together, and united, as by soldering, with a metal of the desired susceptibility to heat, to be thereby sufficiently weakened when it reaches the danger-point to cause the solder to give way under the usual strain and allow the extinguisher to open and become operative, as above stated.

Figure 1:
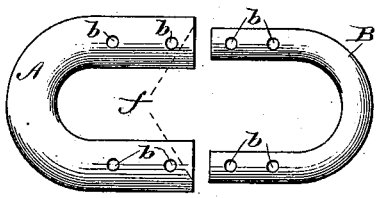
Figure 2:
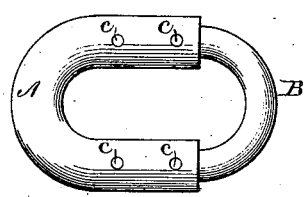
Figure 3:
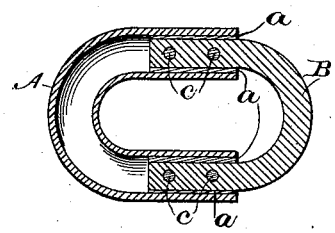
Figure 7:
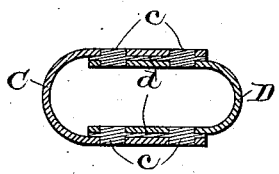
Figure 6:
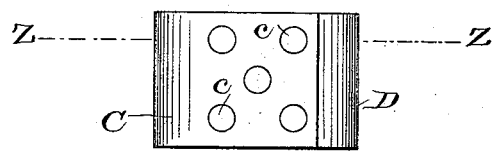
Figure 4:
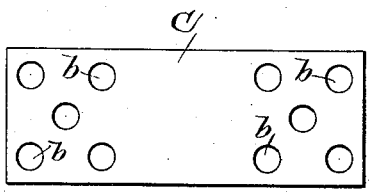
Figure 5:
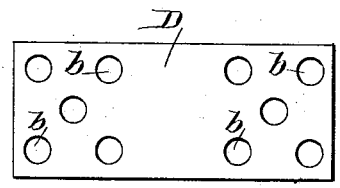
Figure 8:
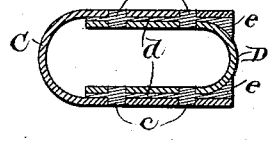

In the accompanying drawings, Figure 1 is a plan view of the two disconnected halves of my link when one half is formed tubular and the other half of wire. Fig. 2 is a view like Fig. 1, but showing the halves of the links as telescoped together. Fig. 3 is a central horizontal section through Fig. 2, and showing the two sections as soldered together. Figs. 4 and 5 are plan views of the two halves of my link as cut from sheet metal and before bending the same. Fig. 6 is a side elevation of the link complete as formed of the two parts shown in Figs. 4 and 5. Fig. 7 is a section taken on line Z Z, Fig. 6. Fig. 8 is an elevation in which the link is viewed from the same point as in Fig. 7, but showing the parts so arranged as to give increased strength to the soldering.

In said views, A represents the tubular half of the link, and B the half formed of wire, of a size to telescope in part A, and when thus arranged, as shown in Figs. 2 and 3, they are secured together by soldering, as shown at $a$, with metal which will fuse and liberate the halves of the link when the temperature rises to the predetermined danger-point.

In Fig. 4, C represents a blank or half-link formed of sheet metal, having the holes $b$ punched therein at each end, and in Fig. 5 a similar blank half-link is shown. These blanks are bent at their center, as are the halves A B, and the halves of the link are telescoped together, as shown in Figs. 6, 7, 8, and when thus arranged the meeting-faces are united by solder $d$ of the proper fusibility, as specified, the solder also filling holes $b$, as represented at $c$, thus forming pins or dowels that extend through the two halves of each side of the link, the shearing strength of said pins tending to resist the strain upon the link. To further increase the strength of the fusible metal that unites the halves of the link, I extend the ends of part C beyond the parallel portion of part D, and so that said ends overreach the curve of part D, whereby an accumulation of the fusible metal takes place at $e$, thereby increasing the uniting strength of the metal that secures the halves C D together. By cutting the ends of tubular half A oblique, as shown by dotted lines at $f$, Fig. 1, the same accumulation of fusible metal may be acquired.

I claim as my invention—

1. A securing-link for automatic fire-extinguishers formed in two parts, of brass or other suitable material, each half being bent into bow-like form, then overlapped and united by soldering with fusible metal or alloy, which will give way at the danger-point in the rise of temperature, substantially as specified.

2. In a securing-link for automatic fire-extinguishers, having the halves overlapped and united by fusible metal or alloy, the overlapping arms of the halves of the link perforated to receive the fusible metal or alloy that secures the halves together, substantially as specified.

3. In a securing-link formed with two bow-like halves united by fusible alloy, the outer half extended to overlap the curved portion of the other half to allow an accumulation of the uniting alloy beneath the ends of said outer half, substantially as specified.

4. A securing-link for automatic fire-extinguishers formed in two bow-like parts, with one part or half of wire, and the other tubular, to overlap the other half, the two being secured together by fusible metal or alloy, substantially as specified.

OSBORN B. HALL.

Witnesses:
T. W. PORTER,
EDWARD F. WHITE.